(12) United States Patent
Boeker et al.

(10) Patent No.: US 8,688,348 B2
(45) Date of Patent: Apr. 1, 2014

(54) METHOD FOR SETTING A WHEEL TORQUE IN A VEHICLE

(75) Inventors: Ralph Boeker, Ludwigsburg (DE); Adrian Thomys, Murr (DE); Oliver Wagner, Allmersbach (DE); Tobias Strauss, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 396 days.

(21) Appl. No.: 13/099,018

(22) Filed: May 2, 2011

(65) Prior Publication Data

US 2011/0295481 A1 Dec. 1, 2011

(30) Foreign Application Priority Data

Jun. 1, 2010 (DE) .......................... 10 2010 029 574

(51) Int. Cl.
*B60K 28/16* (2006.01)
(52) U.S. Cl.
USPC .............................................. 701/87; 701/80
(58) Field of Classification Search
USPC ........... 701/70, 71, 73, 74, 75, 79, 80, 82, 84, 701/87
See application file for complete search history.

(56) References Cited

U.S. PATENT DOCUMENTS

| 6,360,837 | B1 * | 3/2002 | Maier-Landgrebe | 180/197 |
| 6,732,036 | B2 * | 5/2004 | Schmitt | 701/51 |
| 2005/0161295 | A1 * | 7/2005 | Nilsson et al. | 188/158 |
| 2005/0168066 | A1 * | 8/2005 | Svendenius et al. | 303/150 |
| 2006/0129293 | A1 * | 6/2006 | Bernzen et al. | 701/41 |
| 2010/0240485 | A1 * | 9/2010 | Strasser et al. | 475/150 |
| 2010/0245123 | A1 * | 9/2010 | Prasad et al. | 340/870.41 |

FOREIGN PATENT DOCUMENTS

| DE | 37 35 673 | 5/1989 |
| DE | 43 33 281 | 3/1995 |
| DE | 103 04 966 | 11/2003 |
| DE | 10 2006 007 740 | 8/2007 |

* cited by examiner

*Primary Examiner* — Richard Camby
(74) *Attorney, Agent, or Firm* — Kenyon & Kenyon LLP

(57) ABSTRACT

In a method for setting a wheel torque in a vehicle, a setpoint value for a slip-adhesion coefficient gradient for one wheel of one vehicle axle is ascertained, and the wheel torque is set in such a way that the actual value of the gradient is approximated to the setpoint value.

10 Claims, 3 Drawing Sheets

METHOD FOR SETTING A WHEEL TORQUE IN A VEHICLE

BACKGROUND INFORMATION

Driver assistance systems such as anti-lock braking systems (ABS) or anti-slip regulation systems (ASR) are known, via which an intervention may be performed in the vehicle to influence the driving dynamics, independent of the driver. In this case, braking or drive torques at one or more wheels of a vehicle are set to a predefined setpoint value. Precise regulation usually requires exact knowledge of a reference velocity of the vehicle, in order to be able to determine the current actual slip at the vehicle wheels. Ascertaining the reference velocity with high precision is relatively complicated, however; furthermore, determining the reference velocity during a braking process in which the anti-lock braking system is activated, or in the case of an anti-slip regulation system, in particular in vehicles with all-wheel drive, is relatively error-prone. Furthermore, determining the desired setpoint slip on various undersurfaces is a relatively complex process.

SUMMARY OF THE INVENTION

An object of the present invention is to set wheel torques in vehicles to a slip matched to the undersurface, with high precision.

The method according to the present invention is employed to set a wheel torque at one or more vehicle wheels in a motor-driven vehicle. Both drive torques and braking torques at one or more wheels are influenced as wheel torques, with either only a setting of drive torques or a setting of braking torques or a combination of the two being considered in principle. In the case of a regulation of drive torques, a vehicle with all-wheel drive is a prerequisite, since the drive torques must be set at each vehicle axle. If only braking torques are regulated, there is no restriction to all-wheel-drive vehicles, since the braking torques are settable independent of the drive at each vehicle axle or each vehicle wheel.

In the method according to the present invention, a setpoint value for a slip-adhesion coefficient gradient is predefined, and the wheel torques in the vehicle are set in such a way that the actual value of the slip-adhesion coefficient gradient approaches or reaches the setpoint value. The slip-adhesion coefficient gradient is the gradient on the slip-adhesion coefficient curve in which the adhesion coefficient, which designates the quotient of longitudinal force to vertical force at a vehicle wheel, is plotted over the corresponding wheel slip. A point in the slip-adhesion coefficient curve for one vehicle wheel is determined thereby, and a setpoint gradient is predefined, which is set by specifying the wheel torque. Contrary to designs from the related art, a setpoint slip, which is to be set, is thus not predefined but rather a local gradient in the slip-adhesion coefficient correlation is defined, which results automatically in a slip that matches the undersurface.

When specifying a setpoint gradient for the slip-adhesion coefficient correlation, it is enough to know a reference velocity in the vehicle calculated with relatively low precision, since the slip-adhesion coefficient gradient may be approximated using a recursive algorithm. In contrast, when specifying a setpoint slip directly, the reference velocity of the vehicle must be known with high precision. Ascertaining the latter exactly is relatively complicated, however.

A preferred embodiment provides that the setpoint gradient is predefined for one point of a wheel of a first vehicle axle, whereupon the actual gradient is adjusted to the setpoint gradient via the control system. The setpoint gradient is plotted through the starting point, the starting point with wheel slip and adhesion coefficient being ascertained, for example, from a roughly calculated reference velocity of the vehicle, as explained above. In order to ascertain the actual gradient, one point each is needed on the slip-adhesion coefficient curve at one front wheel and one rear wheel, the values for one wheel already being present as the initial value of the recursive algorithm. For the second wheel, the slip and the adhesion coefficient are ascertained from sensor data of the vehicle, for example from measuring values of a sensor system of an electronic stability program (ESP). This necessitates the wheel speeds in order to determine the slip, as well as at least the longitudinal acceleration to calculate the vertical force, which is needed to ascertain the adhesion coefficient. The transverse acceleration may also be considered, in particular when negotiating curves, in order to improve the quality of the calculated vertical force. It is also possible in principle to ascertain the vertical force without transverse acceleration, in particular in the case of straight-ahead travel. It may also be possible to dispense with consideration of the transverse acceleration even when negotiating curves, although the precision is then sacrificed when ascertaining the vertical force.

Carrying out the method also requires a sufficiently exact knowledge of the wheel torques actually taking effect, i.e., the drive torques at the vehicle wheels as well as the braking torques.

When adjusting the actual value of the slip-adhesion coefficient gradient to the associated setpoint value, in the event of a deviation it is useful to shift the straight line of the gradient in parallel. The setpoint gradient thus remains constant. A new point is merely predefined on the slip-adhesion coefficient curve for one vehicle wheel. The point on the curve at the vehicle wheel in question is reset depending on the deviation between setpoint and actual gradient. The shift of the straight line of the gradient in a positive or negative direction depends on the algebraic sign of the deviation between the setpoint and actual value of the gradient.

The setpoint value of the gradient is either kept constant throughout the entire process and predefined for example as a constant, or is ascertained at the beginning of the process from a driving condition variable. However, it is also possible to ascertain and update the slip-adhesion coefficient gradient continuously, as a function of at least one current driving condition variable, in particular as a function of the vehicle velocity.

To calculate the actual gradient, on which the comparison with the setpoint gradient is based, a second point on the slip-adhesion coefficient curve for the second wheel must be calculated, on the basis of data ascertained using sensor technology. It is necessary to know the slip value and the adhesion coefficient, the slip value being ascertained from the wheel speeds of the wheel in question, and the adhesion coefficient from the quotient of longitudinal force to vertical force at that wheel, as described earlier. The longitudinal force is ascertained from the torques present at that wheel, i.e., the braking torque and/or the drive torque. The vertical force is calculated from a vehicle model, as a function of the longitudinal acceleration and possibly the transverse acceleration.

It may also be possible to dispense with the measured longitudinal acceleration; in that case the differentiated reference velocity is used instead of the measured longitudinal acceleration. In addition, it is possible to use the measured longitudinal acceleration to estimate the quality of the vertical forces on the wheels.

In a preferred embodiment, the rear wheel is kept stable and a defined slip is allowed for the front wheel. It is also possible in principle to carry out the method in reverse, however, in which case a point is predefined at the front axle on the slip-adhesion coefficient curve, and the gradient as well as a differential slip are used to determine a corresponding point at the rear axle at which a defined slip is allowed.

According to another aspect, the torques are distributed between the front and the rear axle. In this case a basic ratio is initially assumed for the torque distribution, for example a half-and-half division of the torques between the front and the rear axle, starting from which a redistribution is performed. The torque redistribution results in a shift of the drive torque between the wheels of the front and the rear axles, in order to reduce the risk of instability of one wheel in phases of torque build-up. In particular, the drive torque is shifted from the rear wheel to the front wheel, in order to avoid instability of the rear wheel and thus an accompanying risk of the rear end of the vehicle breaking away. This procedure improves the quality of regulation, since a stable rear wheel is already available at the beginning of the regulation, and with it a good reference value.

A redistribution of this sort may also be applied to electric vehicles with individual-wheel drives, which may be activated individually with relatively little effort.

During torque redistribution, only as much torque is requested at one axle of the vehicle as may be transmitted relatively safely. During the torque build-up phase, a larger proportion of the torque is initially transmitted to the wheels of the other axle, normally the front axle. After an analysis of the rotational dynamics is performed, it is determined what torque may be transmitted safely, which is applied to that vehicle wheel which is to drive steadily.

According to a preferred implementation, a torque is applied to the wheels on the rear axle which ensures the stability of the rear wheels. A corresponding torque redistribution takes place between the front and the rear axles, this intervention normally not being perceptible to the driver. For example, because of the redistribution, when the accelerator pedal is fully depressed on an undersurface with a low friction coefficient, the front wheel first becomes unstable, whereupon a lower adhesion coefficient is set at the rear wheel in order to prevent it from slipping.

DETAILED DESCRIPTION

Figure 1:
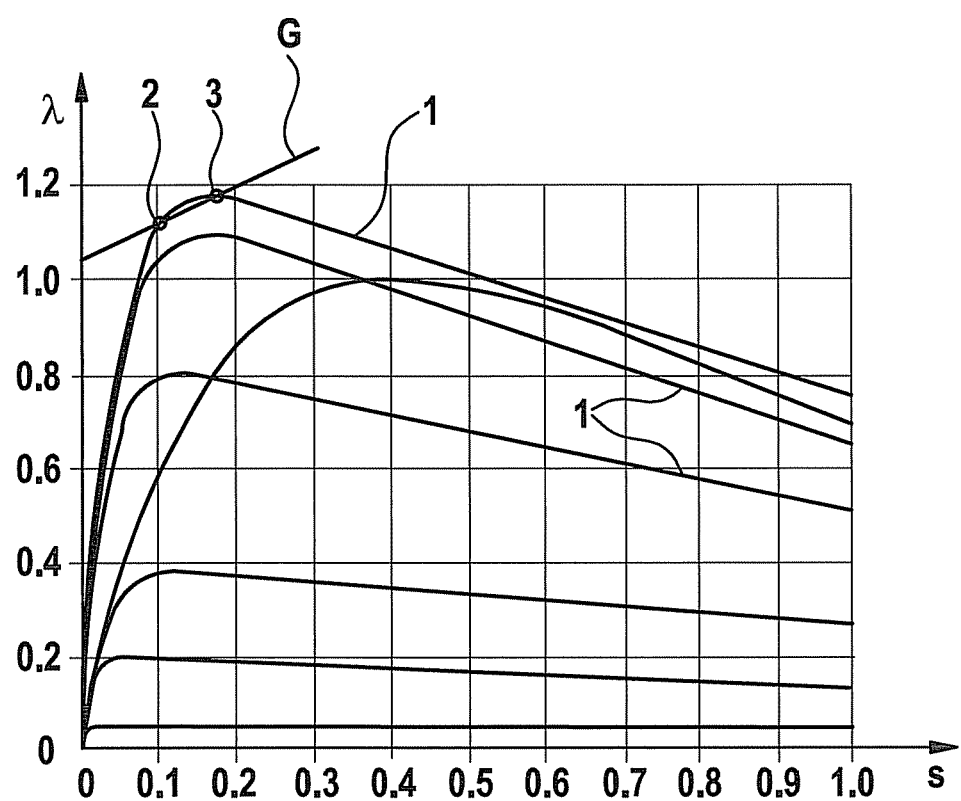
FIG. 1 shows a graph with a plurality of slip-adhesion coefficient curves for one vehicle wheel, the various curves representing different road conditions.

FIG. 1 depicts a slip-adhesion coefficient diagram, having a multitude of curves 1 which depict the correlation between adhesion coefficient λ and slip s at a vehicle wheel for various undersurfaces or road conditions. Adhesion coefficient λ designates the quotient of longitudinal force to vertical force at the vehicle wheel in question. The lower curves in FIG. 1 apply to lower friction coefficients, for example under snowy or icy conditions; the higher curve patterns on the other hand apply to higher friction coefficients. The uppermost curve 1 applies to a dry road surface.

For example, in the area of the maximum of the uppermost curve 1 a gradient G is laid out which is defined as a straight line through two points 2 and 3, of which point 2 is located on the rear wheel and point 3 on the front wheel, with corresponding values for slip s and adhesion coefficient λ. Point 2 on the rear wheel lies before the maximum of curve 1; point 3 on the front wheel on the other hand, with greater slip s and higher adhesion coefficient λ, lies in the area of the maximum or shortly after the maximum of curve 1. Gradient G is defined as $$G = \frac{ds}{d\lambda}$$

as a function of differential slip ds and differential adhesion coefficient dλ between points 2 and 3.

In the method according to the present invention for setting a wheel torque in the vehicle, a setpoint value $G_{setpoint}$ of the gradient is predefined, the wheel torques being set in such a way that the actual gradient $G_{actual}$ approaches or reaches setpoint value $G_{setpoint}$. This method is depicted in FIG. 2.

Figure 2:
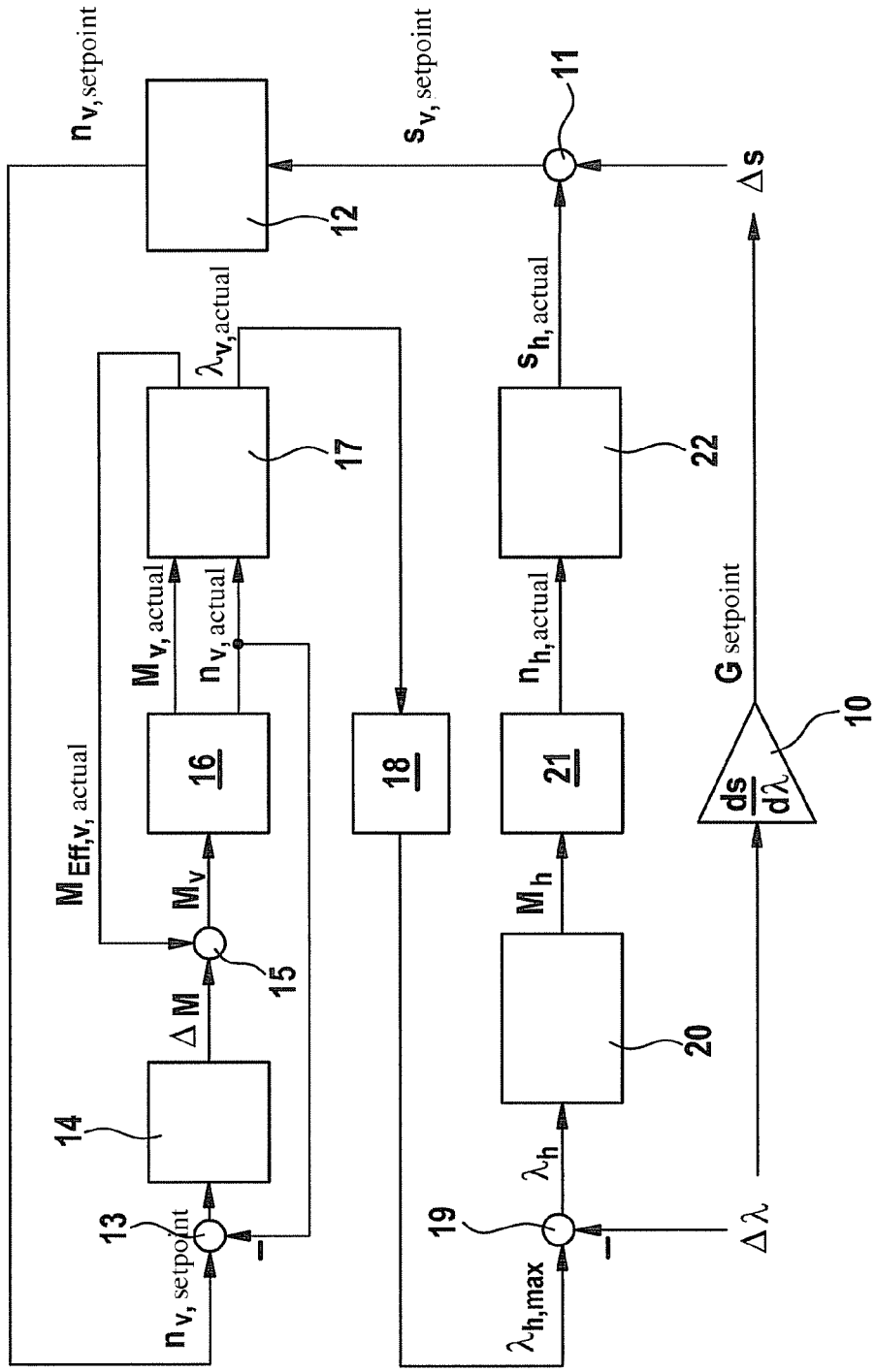
FIG. 2 shows a block diagram for carrying out the method for setting a wheel torque in a vehicle on the basis of a regulation to a gradient on the slip-adhesion coefficient curve.

In a block 10, the setpoint gradient $G_{setpoint}$ is initially predefined, as may be seen in FIG. 2, as well as differential dλ which represents the difference between adhesion coefficients λ between the rear wheel and the front wheel, as well as differential slip Δs, which similarly thereto designates the difference between the slip values at the front wheel and the rear wheel. Of the three values—$G_{setpoint}$, dλ, ds—at least two are predefined, from which the third value may be calculated.

Differential slip ds is added at 11 to an actual slip $s_{h,actutal}$ at the rear wheel, from which the setpoint slip $s_{v,setpoint}$ at the front wheel is obtained. Setpoint slip $s_{v,setpoint}$ at the front wheel enters as an input variable into a block 12, which represents a calculation rule for ascertaining setpoint rotational speed $n_{v,setpoint}$ at the front wheel. At 13 actual rotational speed $n_{v,actual}$ at the front wheel is subtracted from this variable, the difference being supplied to a regulator in block 14 as a control deviation. In block 14, a differential torque ΔM is generated as a manipulated variable, to which the effective or dynamized actual torque $M_{Eff,v,actual}$ at the front wheel is added at 15. This results in control torque $M_v$ for the front wheel, which is supplied to a block 16 as an input variable, which represents the control unit for specifying a wheel torque. This is on the one hand a motor-powered drive torque, and on the other hand a braking torque, it being possible to generate braking and drive torques both separately and cumulatively.

Actual torque $M_{v,actual}$ at the front wheel and actual rotational speed $n_{v,actual}$ at the front wheel are present at block 16 on the output side; these values may be ascertained using an appropriate sensor system. Both values enter as input variables into a wheel dynamics model contained in block 17, from which are ascertained, on the one hand, the effective actual torque $M_{Eff,v,actual}$ at the front wheel and, on the other hand, the actual adhesion coefficient $\lambda_{v,actual}$ at the front wheel.

In a block 18, which represents the delay between the front and the rear wheel, a maximum adhesion coefficient $\lambda_{h,max}$ for the rear wheel is ascertained from the actual adhesion coefficient $\lambda_{v,actual}$ at the front wheel; the differential adhesion coefficient dλ is subtracted from this at 19. From this is obtained adhesion coefficient $\lambda_h$ for the rear wheel, from which control torque $M_h$ at the rear wheel is calculated in a calculation block 20. This goes as an input variable to block 21, in which, similarly to block 16, the wheel torques at the rear wheel are set by appropriate application of the drive unit or the wheel brake. That results in an actual rotational speed $n_{h,actual}$ at the rear wheel, which is supplied to another block 22 to calculate actual slip $s_{h,actual}$ at the rear wheel. This is added to differential slip $\Delta s$, as described earlier.

Figure 3:
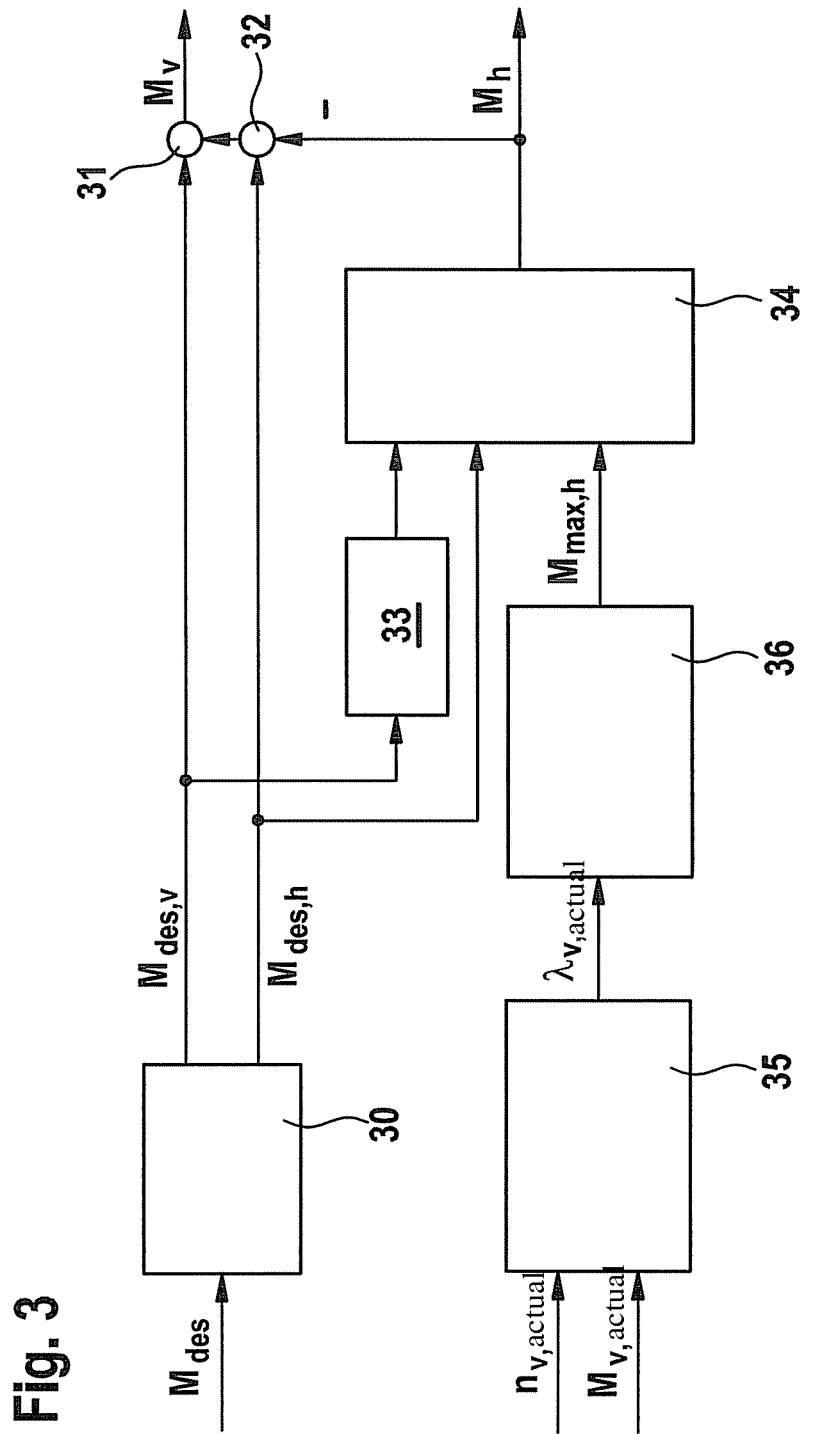
FIG. 3 shows a block diagram for the torque redistribution between the front and the rear axles of a vehicle.

FIG. 3 depicts a structural diagram of the distribution of the wheel torques between the front and the rear axles. The driver predefines a driver's torque request $M_{des}$, either by operating the gas pedal or by operating the brake pedal, which is supplied as an input variable to a first block 30, in which the basic division into a driver's torque request $M_{des,v}$ for the wheels of the front axle and a torque request $M_{des,a}$ for the wheels of the rear axle is performed. The basic division of the torque, which is performed in block 30, corresponds to a fixed division of, for example, 50:50 between the front axle and the rear axle.

The driver's torque request $M_{des,v}$ for the front axle is added at 31 to the difference between the driver's torque request $M_{des,h}$ at the rear wheel and the control torque $M_h$ at the rear wheel, from which control torque $M_v$ for the front wheel is obtained.

After a filtering in block 33, the driver's torque request $M_{des,v}$ for the front wheel as well as the driver's torque request $M_{des,h}$ for the rear wheel are supplied as input variables to a block 34, to which a maximum torque $M_{max,h}$ for the rear wheel is supplied as an additional input variable. From these input variables, the smallest value is determined in block 34, which represents control torque $M_h$ for the rear wheel. On the one hand, at 32 this is subtracted from the driver's torque request $M_{des,h}$ for the rear wheel; on the other hand, control torque $M_h$ for the rear wheel and control torque $M_v$ for the front wheel are supplied to the respective control units to implement the wheel torque.

Maximum torque $M_{max,h}$ at the rear wheel is ascertained in two blocks 35 and 36, block 35 containing a wheel dynamics model, to which actual rotational speed $n_{v,actual}$ at the front wheel and actual torque $M_{v,actual}$ at the front wheel are supplied as input variables. Similarly to block 17 from FIG. 2, actual adhesion coefficient $\lambda_{v,actual}$ at the front wheel is ascertained herefrom, which is supplied as an input variable to block 36, in which a calculation rule is used to calculate maximum torque $M_{max,h}$ at the rear wheel.

What is claimed is:

1. A method for setting a wheel torque in a vehicle, comprising:
for at least one wheel on one vehicle axle, ascertaining a setpoint value for one of a) a slip-adhesion coefficient gradient, which gradient is a slope of a curve in which adhesion coefficient values are plotted over corresponding wheel slip values, or b) a variable correlated to the slip-adhesion coefficient gradient, and setting the wheel torque in such a way that an actual value of the slip-adhesion coefficient gradient is approximated to the setpoint value; and
ascertaining the slip-adhesion coefficient gradient from a wheel slip of one wheel and an adhesion coefficient as a quotient of longitudinal force to vertical force at the wheel.

2. The method according to claim 1, wherein, in the event that the actual value of the slip-adhesion coefficient gradient does not reach the setpoint value, a straight line of the gradient is shifted in parallel.

3. The method according to claim 1, wherein the setpoint value of the slip-adhesion coefficient gradient is kept constant.

4. The method according to claim 1, wherein the setpoint value of the slip-adhesion coefficient gradient is ascertained as a function of at least one current driving condition variable, including a vehicle velocity.

5. The method according to claim 1, wherein the actual value of the slip-adhesion coefficient gradient is calculated from the wheel slip and the adhesion coefficient of a front wheel and a rear wheel.

6. The method according to claim 5, wherein the adhesion coefficient at one wheel of one vehicle axle, including the rear wheel, is previously adopted.

7. The method according to claim 6, wherein the wheel slip and the adhesion coefficient at one wheel of the other vehicle axle, including the front wheel, are ascertained from measured values.

8. The method according to claim 1, wherein the wheel slip is calculated from measured wheel rotational speeds and a reference velocity.

9. The method according to claim 1, wherein at least one of (a) braking torques and (b) drive torques is set to achieve the setpoint value of the gradient.

10. A regulating or control device for setting a wheel torque in a vehicle, the device comprising an arrangement for performing the following:
for at least one wheel on one vehicle axle, ascertaining a setpoint value for one of a) a slip-adhesion coefficient gradient, which gradient is a slope of a curve in which adhesion coefficient values are plotted over corresponding wheel slip values, or b) a variable correlated to the slip-adhesion coefficient gradient, and setting the wheel torque in such a way that an actual value of the slip-adhesion coefficient gradient is approximated to the setpoint value; and
ascertaining the slip-adhesion coefficient gradient from a wheel slip of one wheel and an adhesion coefficient as a quotient of longitudinal force to vertical force at the wheel.

* * * * *